United States Patent Office 3,506,680
Patented Apr. 14, 1970

3,506,680
METHOD OF TREATING HYPERTENSION IN ANIMALS WITH AMINOGUANIDINES
Arthur Berger, Skokie, Ill., Edeltraut E. Borgaes, Sindelfingen, Germany, and John C. Longstreet, Evanston, Ill., assignors to Baxter Laboratories, Inc., Morton Grove, Ill., a corporation of Delaware
No Drawing. Continuation-in-part of application Ser. No. 560,898, June 27, 1966. This application Jan. 18, 1968, Ser. No. 698,689
Int. Cl. A01n 9/20, 9/24
U.S. Cl. 424—326                                             1 Claim

ABSTRACT OF THE DISCLOSURE

A method of treating hypertension in animals by administering thereto an effective amount of a compound selected from the group consisting of aminoguanidines of the formula:

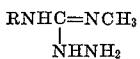

in which R is selected from the group consisting of 2-monohalogen-substituted benzyl and 2-methylbenzyl; and the pharmaceutically acceptable salts of said aminoguanidines.

---

This is a continuation-in-part of copending application Ser. No. 560,898, filed June 27, 1966, now abandoned. Application Ser. No. 560,898 is a division of application Ser. No. 280,744, filed May 15, 1963, now abandoned.

The present invention relates to novel aminoguanidines. More particularly, the present invention relates to a method for treating hypertension in animals which comprises administering to an animal a small but effective amount of a compound selected from the group consisting of aminoguanidines having the formula:

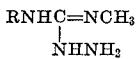

in which R is selected from the group consisting of 2-monohalogen-substituted benzyl and 2-methylbenzyl; and the pharmaceutically acceptable salts of said aminoguanidines.

As used herein, the term "halogen" is defined to include the four members of the Group VII–B elements of the Periodic Table, fluorine, chlorine, bromine and iodine.

The aminoguanidines of the present invention are strong bases and, therefore, are preferably employed in the form of their pharmaceutically acceptable salts. The salts to be pharmaceutically acceptable should not possess toxic or other physiologically undesirable characteristics. Conventional salt forms such as, for example, the hydriodide, hydrochloride, hydrobromide, sulfonate, glutamate, phosphate, acetate, citrate, ascorbate, maleate, fumarate and the like are suitable for purposes of the present invention.

In accordance with the present invention, when the above compounds are formulated with solid or liquid pharmaceutically acceptable carriers and administered orally, rectally or parenterally to an animal, an immediate and prolonged drop in blood pressure results. When employed intravenously, the preferred dosage range is from about 0.1 to about 20 mg./kg. daily. Orally or rectally, the dosage will preferably vary from about 1 to about 100 mg./kg. daily. Higher and lower dosages may also be effective, depending upon the present level of blood pressure in the animal and the level to which it is desired to be reduced.

The preferred method of administration is orally in the form of tablets, capsules and the like. The oral dosage form can be prepared by conventional procedures for making pharmaceutical tablets and capsules, for example, tableting by compression or molding, encapsulation by spray drying, microencapsulation, and the like. The oral dosage form can employ conventional fillers and the like materials, for example, diluents, binders, lubricants, disintegrators, coloring and flavoring agents in addition to the active hypotensive compounds defined herein. Examples of such filler materials are corn starch, gelatin, gums such as carboxymethyl cellulose, acacia and locust bean gum, sugars such as sucrose, dextrose and lactose, salts such as sodium chloride, calcium phosphate and calcium sulfate, and the like materials.

When administered intravenously, the compounds employed in the method of this invention are preferably dissolved in sterile distilled water or other physiologically acceptable liquid media.

The aminoguanidines of the present invention can be readily prepared in two steps from the corresponding thiourea with a thiopseudourea acting as an intermediate. Reaction of the thiourea with an alkyl halide produces the intermediate thiopseudourea which is then reacted with hydrazine to produce the desired aminoguanidine as the hydrohalide salt. The substituent desired in the aminoguanidine can be obtained by using as the starting material a thiourea containing the corresponding substituent. The reaction which takes place in the preferred process of preparing the aminoguanidines of the present invention is illustrated by the following equation:

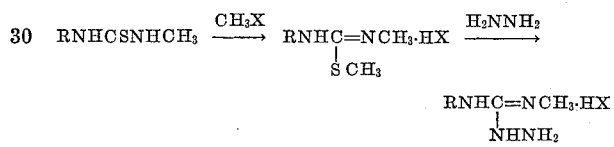

in which R is defined as hereinbefore and X is a halogen atom.

The free base form of the aminoguanidine can be conveniently prepared by reacting the corresponding salt with an alkaline reagent, for example, sodium carbonate, sodium hydroxide, aqueous ammonia, and other such alkaline reagents commonly used for converting salts to free bases. The free base can be converted, in turn, to the salt form of administering them to animals are not limited to any ceptable acids of the salts hereinbefore defined.

Although the above methods of preparing the aminoguanidines of this invention are described herein, it will be understood that these aminoguanidines and the method of administering them to animals are not limited to any particular method of preparation.

The following examples will further illustrate the present invention although the invention is not limited to these specific examples. All percentages herein are on a weight basis unless otherwise specified.

EXAMPLE I

Synthesis of 1-amino-3-(2-chlorobenzyl)-2-methyl guanidine·hydriodide

A mixture of 7.1 grams (0.02 mole) of 1-(2-chlorobenzyl) - 2,3 - dimethyl-2-thiopseudourea·hydriodide and 40 ml. of a methanolic solution 0.5 molar with respect to hydrazine was refluxed for one hour. After cooling, the mixture was added to 200 ml. of dry ether, the upper layer was decanted off, fresh ether was added, and the oily layer solidified. The solid was collected, washed with ether and dried. The yield was approximately quantitative of a white solid, M.P. 98–101° C.

The subject compound was administered intravenously (i.v.) to anesthetized, normotensive dogs. Femoral blood pressure, pressor responses following bilateral carotid artery occlusion and heart rate were monitored at 20 minute intervals following treatment for at least one hour and longer if activity was observed: Hypotension was considered to be present if a sustained 20% lowering of blood pressure occurred, and sympathetic reactivity inhibition was considered to be present if the carotid occlusion reflex was decreased 25% or more of control levels. 1-amino-3-(2 - chlorobenzyl) - 2 - methyl guanidine was found to have hypotensive activity in a dose of 10 mg./kilogram i.v. and to inhibit the carotid occlusion reflex at a threshold dose of 2.5 mg./kilogram of animal body weight.

Substantially similar hypotensive results are obtained when equivalent amounts of the bromo and iodo analogs are substituted for the 1-amino-3-(2-chlorobenzyl)-2-methyl guanidine·hydriodide in the above example.

EXAMPLE II

Synthesis of 1-amino-3-(2-fluorobenzyl)-2-methyl guanidine·hydriodide

To 10.2 grams (0.03 mole) of 1-(2′-fluorobenzyl)-2,3-dimethyl-2-thiopseudourea·hydriodide was added 30.9 ml. (0.03 mole) of 1.0 N hydrazine hydrate in methanol. The mixture was heated under reflux for four hours and then poured into a petri dish. A reddish sticky material was obtained after the mixture stood overnight at room temperature. Washing of the material with ethyl acetate produced an off-white solid. On drying the solid, 9.1 grams (94% of theoretical) of 1-amino-3-(2-fluorobenzyl)-2-methyl guanidine·hydriodide, M.P. 129–130° C., was obtained. On titration of 0.340 gram of this compound with 0.10 N silver nitrate using Eosin as indicator, 10.0 ml. of silver nitrate was used, which is the theoretical amount for iodide. Analysis of the compound, empirical formula $C_9H_{12}FIN_4$, gave the following results:

Calc'd (percent): C, 33.35; H, 4.35; N, 17.29. Found (percent): C, 33.06; H, 4.50; N, 17.50.

The subject compound was administered i.v. to anesthetized, normotensive dogs. In this administration said compound produced a prompt nictitating membrane reaction, loss of lid ptosis (widening of the palpebral fissure) and slight mydriasis; these results were followed by a normalization of pupil size, return of lid ptosis and relaxation of the nictitating membrane one to two hours post injection of 5 or 10 mg./kg. by the i.v. route.

The subject compound produces an early vassopressor response and increase in heart rate; these results are followed by normalization in one hour and subsequent emergence of hypotension during the second through sixth hours post-Rx. Said compound also elicits almost complete blockage of the sympathetically-mediated carotid sinus pressoreceptor reflex at a dose of 5 mg./kg. This latter response lasts much longer than six hours.

EXAMPLE III

Synthesis of 1-amino-3-(2-methylbenzyl)-2-methyl guanidine·hydriodide

A mixture of 22.2 grams (0.066 mole) of 2,3-dimethyl-1-(2-methylbenzyl)-2-thiopseudourea·hydriodide, 20 ml. of methanol and 20.4 ml. of 3.30 N hydrazine in methanol (slight excess over theory) was refluxed for 20 hours. Most of the solvent was removed by heating and the residue was transferred to a petri dish. As the mixture cooled, crystals started to form and, after being allowed to stand for several hours, The solid was collected on a filter. On washing with dry ether and drying, 14.7 grams (69% of the theoretical) of a white solid, M.P. 128–130° C., with an analysis corresponding to 1-amino-3-(2-methylbenzyl)-2-methyl guanidine·hydriodide, was obtained. The subject compound has hypotensive activity in dogs in doses of 2.5–10 mg./kg. i.v. and inhibits the carotid occlusion reflex at a threshold dose of 2.5 mg./kg.

What is claimed is:

1. The method of treating hypertension in animals comprising administering internally to an animal a hypotensively effective amount of an aminoguanidine having the formula:

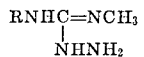

in which R is selected from the group consisting of 2-monohalogen-substituted benzyl and 2-methylbenzyl; or the pharmaceutically acceptable salts of said aminoguanidines.

References Cited

UNITED STATES PATENTS

| | | | |
|---|---|---|---|
| 3,131,218 | 4/1964 | Spickett et al. | 260—564 |
| 3,168,562 | 2/1965 | Walton et al. | 260—564 |
| 3,288,677 | 11/1966 | Barrett et al. | 424—199 |
| 3,336,385 | 8/1967 | Berger et al. | 260—564 |

ALBERT T. MEYERS, Primary Examiner

D. J. FUNDERBURK, Assistant Examiner

UNITED STATES PATENT OFFICE
CERTIFICATE OF CORRECTION

Patent No. 3,506,680    Dated April 14, 1970

Inventor(s) Arthur Berger, Edeltraut E. Borgaes & John C. Longstreet

It is certified that error appears in the above-identified patent and that said Letters Patent are hereby corrected as shown below:

In the specification, at col. 2, lines 42 to 45, cancel "The free base can be converted, in turn, to the salt form of administering them to animals are not limited to any ceptable acids of the salts hereinbefore defined" and insert --The free base can be converted, in turn, to the salt form of the compound by reaction with pharmaceutically acceptable acids of the salts hereinbefore defined--.

In the claims, at col. 4, line 34, cancel "2-methylibenzyl" and insert --2-methylbenzyl--.

SIGNED AND SEALED

AUG 25 1970

(SEAL)
Attest:

Edward M. Fletcher, Jr.
Attesting Officer

WILLIAM E. SCHUYLER, JR.
Commissioner of Patents